US010136571B2

(12) United States Patent
Butler et al.

(10) Patent No.: US 10,136,571 B2
(45) Date of Patent: Nov. 27, 2018

(54) LAND CULTIVATING SYSTEMS AND METHODS UTILIZING HIGH-PRESSURE FLUID JET CUTTING TECHNIQUES

(71) Applicant: Flow International Corporation, Kent, WA (US)

(72) Inventors: Gregory Dean Butler, Clare (AU); Jeffrey Evan Martel, Grimsby (CA); Mohamed A. Hashish, Bellevue, WA (US); Jean-Christophe Vidil, Redmond, WA (US)

(73) Assignee: Flow International Corporation, Kent, WA (US)

( * ) Notice: Subject to any disclaimer, the term of this patent is extended or adjusted under 35 U.S.C. 154(b) by 0 days.

(21) Appl. No.: 15/136,623

(22) Filed: Apr. 22, 2016

(65) Prior Publication Data
US 2017/0303460 A1    Oct. 26, 2017

(51) Int. Cl.
| | |
|---|---|
| *A01B 49/06* | (2006.01) |
| *A01B 79/02* | (2006.01) |
| *A01C 5/06* | (2006.01) |
| *A01B 17/00* | (2006.01) |
| *A01B 63/14* | (2006.01) |
| *A01C 7/08* | (2006.01) |

(Continued)

(52) U.S. Cl.
CPC ............ *A01B 49/06* (2013.01); *A01B 17/004* (2013.01); *A01B 63/14* (2013.01); *A01B 79/02* (2013.01); *A01C 5/062* (2013.01); *A01C 5/068* (2013.01); *A01C 7/08* (2013.01); *A01C 23/007* (2013.01); *A01C 23/047* (2013.01)

(58) Field of Classification Search
CPC ....... A01B 49/06; A01B 79/02; A01B 17/004; A01B 63/14; A01C 5/062; A01C 23/023; A01C 23/024; A01C 23/025; A01C 23/047; A01C 5/068; A01C 7/08; A01C 23/007
USPC ......................................................... 111/139
See application file for complete search history.

(56) References Cited

U.S. PATENT DOCUMENTS

| | | | | |
|---|---|---|---|---|
| 3,533,366 | A | * | 10/1970 | Francom .............. A01C 23/023 111/125 |
| 4,638,748 | A | * | 1/1987 | Kopecky, IV ........... A01O 5/06 111/124 |

(Continued)

OTHER PUBLICATIONS

Niemöller et al., "Injection Fertilizing with a High Pressure Water Jet," 63 Landtechnik, May 2008, pp. 272-273.

(Continued)

*Primary Examiner* — John Weiss
(74) *Attorney, Agent, or Firm* — Cozen O'Connor (57) ABSTRACT

Land cultivating systems and methods utilizing high-pressure fluid jet cutting techniques are disclosed. An example system includes a mobile unit, a traveler arrangement operably coupled to the mobile unit to ride on the surface of stubble residues as the mobile unit moves across land to be cultivated, and a fluid jet cutting head supported by the traveler arrangement. The cutting head is configured to selectively discharge a high-pressure fluid jet to make a cut through the stubble residues and underlying soil as the mobile unit moves across the land. A soil opening device is provided to form a furrow in the ground in line with the cut made by the high-pressure fluid jet, and a liquid injector nozzle is provided to discharge fertilizer or other chemical(s) into the soil.

35 Claims, 5 Drawing Sheets

(51) Int. Cl.
    *A01C 23/00*     (2006.01)
    *A01C 23/04*     (2006.01)

(56) References Cited

U.S. PATENT DOCUMENTS

| | | | | |
|---|---|---|---|---|
| 4,942,833 | A * | 7/1990 | Hill | A01B 45/00 |
| | | | | 111/121 |
| 5,643,058 | A | 7/1997 | Erichsen et al. | |
| 7,870,827 | B2 * | 1/2011 | Bassett | A01C 23/024 |
| | | | | 111/119 |
| 9,675,005 | B1 * | 6/2017 | Bergmeier | A01C 23/025 |
| 9,814,172 | B2 * | 11/2017 | Achen | A01L 363/32 |
| 9,820,427 | B2 * | 11/2017 | Hagny | A01C 7/06 |

OTHER PUBLICATIONS

Butler, Greg, "Aqua-Till—seeding without soil engagement," SANTFA—The No-Till Journal vol. 8 No. 2, Apr. 2011, pp. 44-50.
Butler, Greg, "Exploring the potential of UHP jet-stream technology," SANTFA The Cutting Edge, Winter 2013, pp. 410-413.
SANTFA Conservation Agriculture in Action, 2016 Annual SANTFA Conference, 34 pages.

* cited by examiner

LAND CULTIVATING SYSTEMS AND METHODS UTILIZING HIGH-PRESSURE FLUID JET CUTTING TECHNIQUES

BACKGROUND

Technical Field

This disclosure relates to land cultivating systems and methods utilizing high-pressure fluid jet cutting techniques to facilitate no-till farming.

Description of the Related Art

Zero-till or no-till farming is a way of growing crops from year to year without disturbing the soil through tillage and has been adopted in many areas throughout the world. In accordance with such farming activities, stubble residues are often left in the agricultural field after crops are harvested each year. Advantageously, stubble residues assist in retaining soil moisture during dry periods, while also minimizing soil erosion during rainfall events or in high-wind conditions. In addition, the stubble residues break down and act as mulch, returning nutrients and carbon to the underlying soil.

Typical zero-till or no-till seeding units include a single- or double disc opener or knife point seeder for forming a furrow in the soil, a seeding head for depositing seed in the furrow, and a seed-firmer or press-wheel to close the furrow after the seeds have been deposited. The single- or double disc opener may follow behind a coulter device, which may be used to plow through stubble residues while the single- or double disc opener forms the furrow. Some zero-till or no-till seeding units further incorporate an apparatus to deposit controlled volumes of fertilizer and/or chemical(s) in or adjacent the furrows to promote seed-germination, promote plant growth and/or to control competing weeds. Conventional zero-till or no-till seeding units, however, may suffer from a variety of deficiencies and drawbacks, including, for example, poor or uneven soil penetration during formation of the seed-receiving furrow and hair-pinning, wherein stubble residues are pushed into the furrow rather than being cut or pushed aside.

BRIEF SUMMARY

Embodiments described herein provide enhanced systems and methods for zero-till or no-till farming which utilize high-pressure fluid jet cutting techniques. For example, one embodiment is directed to a system including a high-pressure fluid jet cutting head arranged to cut through stubble residues ahead of a soil opening device (e.g., knife-point-tine, single- or double disc opener), and a liquid injection nozzle to inject fertilizer or other chemical(s) into the cut formed by the high pressure fluid jet cutting head.

According to another embodiment, a high-pressure fluid jet system to assist with cultivating land having soil underlying stubble residues may be summarized as including: a mobile unit; a traveler arrangement operably coupled to the mobile unit to ride on the surface of the stubble residues as the mobile unit moves across the land; a fluid reservoir; a pump coupled to the fluid reservoir and operable to selectively provide a source of high-pressure fluid; a fluid jet cutting head coupled to the traveler arrangement and configured to receive high-pressure fluid from the pump, and being operable to selectively discharge a high-pressure fluid jet to make a cut through the stubble residues and the underlying soil as the mobile unit moves across the land during operation; a soil opening device coupled to the traveler arrangement aft of the fluid jet cutting head to form a furrow in the ground in line with the cut made by the high-pressure fluid jet discharged from the fluid jet cutting head during operation; and a liquid injector nozzle coupled to the traveler arrangement separate from the fluid jet cutting head and arranged to discharge at least one of an insecticide, a wetter, a fungicide, an herbicide and a fertilizer into the soil as the mobile unit moves across the land during operation.

The traveler arrangement may include a standoff distance control mechanism to maintain a jet outlet of the fluid jet cutting head at a desired height above a surface of the stubble residues during operation. The traveler arrangement may also be configured to lightly compress and hold the stubble residues to be cut. For example, the standoff distance control mechanism may include a ski member arranged to ride on the surface of the stubble residues via a parallel link arm assembly, spring arm, or other structure, the fluid jet cutting head being coupled to the ski member with the jet outlet thereof in close proximity to an underside of the ski member so as to maintain the fluid jet cutting head at the desired height above the surface of the stubble residues. An aft portion of the ski member may be shaped to serve as a seed-firmer device to improve seed to soil contact of seeds deposited into the furrow formed by the soil opening device during operation. As another example, the standoff distance control mechanism may include a wheeled member arranged to ride on the surface of the stubble residues via a parallel link arm assembly, spring arm, or other structure.

The system may further include a seeding device coupled to the traveler arrangement and operable to deposit seeds in the furrow formed by the soil opening device, and a seed-firmer device positioned aft of the soil opening device which is configured to improve seed to soil contact of the seeds deposited into the furrow.

The soil opening device may include a tine member, disc member or other device configured to open the soil. In one embodiment, a tine member is provided which includes a seed conduit extending therethrough for depositing seeds into the furrow as the tine member passes through the soil to form the furrow. The system may further include a drive motor operably coupled to the tine member for adjusting a depth of soil engagement of the tine member, and a controller in communication with the drive motor for controlling the depth of soil engagement of the tine member. The controller may be configured to control the depth of soil engagement based at least in part on soil condition. The controller may also be configured to control the depth of soil engagement in coordination with the fluid jet discharged from the fluid jet cutting head to form a series of furrows in the soil underlying the stubble residues.

The system may further include a liquid source coupled to the liquid injector nozzle to supply liquid to be discharged into the soil, the liquid comprising the at least one of the insecticide, the wetter, the fungicide, the herbicide and the fertilizer. The system may further include a controller in communication with the liquid source, the controller being configured to control the supply of the liquid to the liquid injector nozzle in coordination with the high-pressure fluid jet discharged from the fluid jet cutting head.

In some instances, the system may further include an additive source coupled to the fluid jet cutting head to supply an additive to be selectively mixed with the high-pressure fluid jet after jet formation, the additive comprising at least one of an insecticide, a wetter, a fungicide, an herbicide and a fertilizer. The system may further include a controller in communication with the additive source, the controller being configured to control the supply of the additive to the fluid jet cutting head for mixing the additive with the high-pressure fluid jet only during a portion of a time in which the high-pressure fluid jet is discharged from the fluid jet cutting head.

The system may further include a seed source and a controller in communication with the seed source, the controller being configured to coordinate the delivery of seeds from the seed source with the formation of the furrow in the ground.

The system may further include a controller in communication with the fluid jet cutting head, the controller being configured to control the fluid jet cutting head to intermittingly discharge the high-pressure fluid jet into the ground as the mobile unit moves across the land to make intermittent cuts in the stubble residues and underlying soil.

In some instances, the fluid jet cutting head may include an orifice member that is configured to generate the high-pressure fluid jet as a fan shaped jet as the high-pressure fluid from the pump passes through the orifice member. The fan shaped jet may be characterized by a narrow jet width and an elongated jet length, and the elongated jet length may be aligned with a direction of travel of the fluid jet cutting head as the mobile unit moves across the land during operation. In other instances, the elongated jet length may be aligned perpendicular to the direction of travel of the fluid jet cutting head.

In some instances, the fluid jet cutting head may include an orifice member configured to generate the high-pressure fluid jet as the high-pressure fluid from the pump passes through the orifice member; and a shroud to surround a portion of the high-pressure fluid jet downstream of the orifice member, the shroud including a port through which an additive is selectively supplied to mix with the high-pressure fluid jet.

The fluid jet cutting head may be one of a plurality of fluid jet cutting heads arranged in a parallel arrangement on the mobile unit, each fluid jet cutting head being operable to selectively discharge a respective high-pressure fluid jet into the land to make parallel cuts through the stubble residues and underlying soil.

In some instances, fluid jet cutting head may be one of a plurality of fluid jet cutting heads arranged in line with a direction of travel such that an aft one of the cutting heads may discharge a fluid jet into a cut formed by a leading one of the cutting heads.

The fluid jet cutting head may be configured to oscillate along a direction transverse to a travel direction of the mobile unit to widen the cut in the stubble residues and underlying soil made by the fluid jet cutting head during operation. In other instances, the fluid jet cutting head may be configured to move in an orbital path to widen the cut in the stubble residues and underlying soil made by the fluid jet cutting head during operation.

The fluid jet cutting head may include an orifice member configured to generate the high-pressure fluid jet and a sensor positioned downstream of the orifice member to sense a condition of the orifice member.

The fluid jet cutting head may include a diamond orifice member configured to generate the high-pressure fluid jet as the high-pressure fluid from the pump passes through the diamond orifice member during operation. In other instances, the orifice member may be a sapphire or other jewel orifice member.

The pump may be operable to selectively provide a source of high-pressure fluid at an operating pressure of at least 5,000 psi. In some instances, the pump may be operable to selectively provide a source of high-pressure fluid at an operating pressure of at least 20,000 psi, and in other instances, at least 40,000 psi.

The fluid jet cutting head may include: an orifice member configured to generate the high-pressure fluid jet as the high-pressure fluid from the pump passes through the orifice member; a mixing chamber downstream of the orifice member, the mixing chamber being in fluid communication with an additive source to enable an additive to be introduced into the high-pressure fluid jet, the additive comprising at least one of an insecticide, a wetter, a fungicide, a herbicide and a fertilizer; and a mixing nozzle in fluid communication with the mixing chamber, the mixing nozzle including a discharge conduit through which the additive and high-pressure fluid jet are further mixed prior to discharge from a jet outlet of the fluid jet cutting head.

According to another embodiment, a high-pressure fluid jet system to assist with agricultural cultivation activities (including crop production) may be summarized as including: a mobile unit having a seed source; a fluid reservoir; a pump coupled to the fluid reservoir and operable to selectively provide a source of high-pressure fluid; and a fluid jet cutting head configured to receive high-pressure fluid from the pump and operable to generate a high-pressure fluid jet and discharge the fluid jet through a nozzle, and including a shroud at least partially surrounding the nozzle and having a seed port through which seeds are passed to be deposited in the ground. A seed passage may be formed between the shroud and the nozzle of the fluid jet cutting head.

According to yet another embodiment, a high-pressure fluid jet system to assist with agricultural cultivation activities may be summarized as including a mobile unit having a seed source; a fluid reservoir; a pump coupled to the fluid reservoir and operable to selectively provide a source of high-pressure fluid; and a fluid jet cutting head configured to receive high-pressure fluid from the pump and to generate a high-pressure fluid jet, and being further configured to draw seeds from the seed source to be deposited into one or more furrows using suction arising from movement of the high-pressure fluid jet through the fluid jet cutting head.

According to still yet another embodiment, a high-pressure fluid jet system to assist with agricultural cultivation activities may be summarized as including: a mobile unit having a fluid reservoir; a pump coupled to the fluid reservoir and operable to selectively provide a source of high-pressure fluid; and a fluid jet cutting head configured to receive the high-pressure fluid from the pump and including an orifice member to generate a high-pressure fan shaped fluid jet as the high-pressure fluid from the pump passes through the orifice member. The fan shaped jet may be characterized by a narrow jet width and an elongated jet length, and wherein the elongated jet length may be aligned with a direction of travel of the mobile unit.

According to another embodiment, a method of seeding land having soil underlying stubble residues may be summarized as including: making a cut through the stubble residues and the underlying soil with a high-pressure fluid jet; separately injecting at least one of an insecticide, a wetter, a fungicide, an herbicide and a fertilizer into the soil; forming a seed-receiving furrow aligned with the cut made by the high-pressure fluid jet; and depositing seeds into the furrow.

Forming the seed-receiving furrow may include moving a tine member through the underlying soil, and depositing the seeds into the furrow may include depositing the seeds into the furrow through a seed passage extending through the tine member. Making a cut through the stubble residues and the underlying soil with a high-pressure fluid jet may include simultaneously compressing and holding the stubble residues. Injecting the insecticide or other chemical agents into the soil may include utilizing a liquid injector nozzle positioned in line with a fluid jet cutting head from which the high-pressure fluid jet is discharged. Making the cut through the stubble residues and the underlying soil with the high-pressure fluid jet may include oscillating the high-pressure fluid jet transverse to a longitudinal direction of the cut. Making the cut through the stubble residues and the underlying soil with the high-pressure fluid jet may include moving the high-pressure fluid jet in an orbital path. Making the cut through the stubble residues and the underlying soil with the high-pressure fluid jet may include: generating the high pressure fluid jet with an orifice unit of a fluid jet cutting head using high-pressure fluid supplied by a pump; mixing an additive with the high-pressure fluid jet after jet formation, the additive comprising at least one of an insecticide, a wetter, a fungicide, a herbicide and a fertilizer; and discharging the high-pressure fluid jet mixed with the additive into the ground. Mixing the additive with the high-pressure fluid jet may include entraining the additive into the high-pressure fluid jet using suction arising from movement of the high-pressure fluid jet through the fluid jet cutting head.

According to another embodiment, a seeding method may be summarized as including: discharging a high-pressure fluid jet from a fluid jet cutting head into soil; and drawing one or more seeds from a seed source into the fluid jet cutting head using suction arising from movement of the high-pressure fluid jet through the fluid jet cutting head for depositing the seeds into the soil.

According to another embodiment, a seeding method may be summarized as including: discharging a high-pressure fluid jet from a fluid jet cutting head into soil, the cutting head including a shroud surrounding a portion of the discharged high-pressure fluid jet; and routing seeds through the shroud to be introduced into the soil.

According to yet another embodiment, a seeding method may be summarized as including: discharging a high-pressure fluid jet from a fluid jet cutting head into soil, the cutting head including a shroud surrounding a portion of the discharged high-pressure fluid jet; and routing an additive through the shroud to be introduced into the soil with the high-pressure fluid jet, the additive including at least one of an insecticide, a wetter, a fungicide, an herbicide and a fertilizer.

DETAILED DESCRIPTION

In the following description, certain specific details are set forth in order to provide a thorough understanding of the various disclosed embodiments. However, one of ordinary skill in the relevant art will recognize that embodiments may be practiced without one or more of these specific details. In other instances, well-known structures associated with fluid jet cutting systems, zero-till or no-till seeding units, and related methods may not be shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Embodiments described herein provide enhanced systems and methods for zero-till or no-till farming utilizing high-pressure fluid jet cutting techniques. Embodiments include, for example, a system comprising a high-pressure fluid jet cutting head arranged to cut through stubble residues ahead of a soil opening device (e.g., single- or double disc opener), and a liquid injection nozzle to inject fertilizer or other chemical(s) into the cut formed by the high pressure fluid jet cutting head.

High-pressure fluid jets, including high-pressure abrasive waterjets, are used to cut a wide variety of materials in many different industries. Systems for generating high-pressure abrasive waterjets are currently available, such as, for example, the Mach 4™ five-axis abrasive waterjet system manufactured by Flow International Corporation, the assignee of the present invention. Other examples of fluid jet cutting systems are shown and described in Flow's U.S. Pat. No. 5,643,058, which is incorporated herein by reference. In such systems, high-pressure fluid, typically water, flows through an orifice of an orifice unit in a cutting head to form a high-pressure jet for cutting various substrates. According to embodiments of the present invention, a high-pressure fluid jet is used to cut through stubble residues and underlying soil to assist in seeding activities, or to assist in performing other agricultural cultivation activities, such as, for example, introducing fertilizer or other chemical(s) into the soil.

As described herein, the term cutting head assembly or cutting head may refer generally to an assembly of components at a jet discharge end of the fluid jet cutting system, and may include, for example, an orifice unit and/or nozzle of the fluid jet cutting system for generating a high-pressure fluid jet and surrounding structures and devices coupled directly or indirectly thereto to move in unison therewith.

Figure 1:
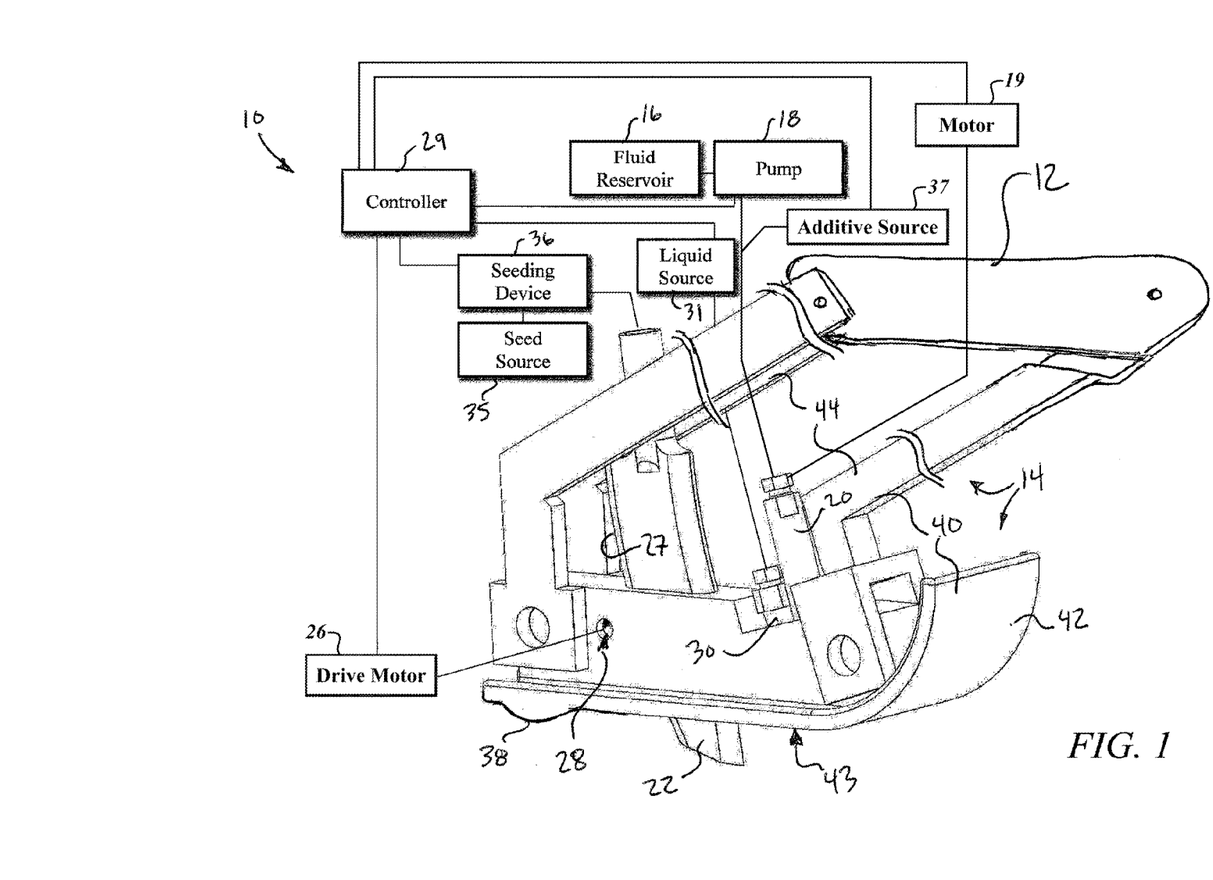
FIG. 1 is a skewed isometric view of a portion of a high-pressure fluid jet system, according to one example embodiment, to assist with cultivating land, particularly land having stubble residues overlying soil.
Figure 2:
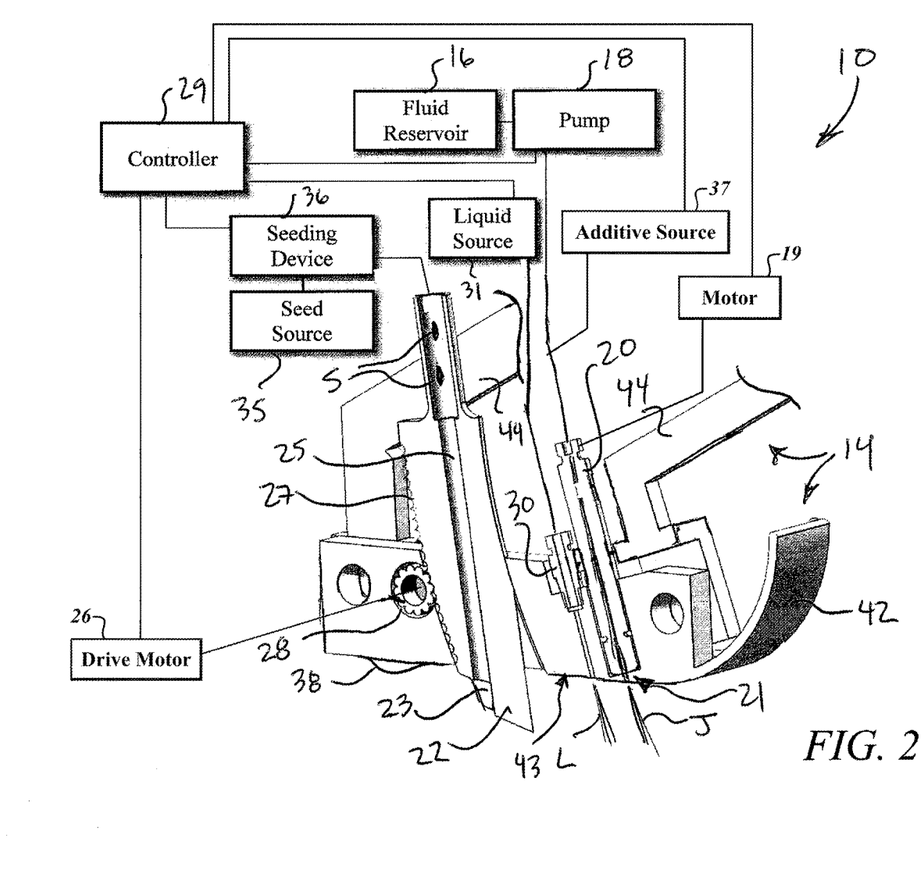
FIG. 2 is a cross-sectional view of the portion of the high-pressure fluid jet system of FIG. 1.

FIGS. 1 and 2 show an example embodiment of a portion of a high-pressure fluid jet system 10 to assist with cultivating land, particularly land having stubble residues overlying soil. The high-pressure fluid jet system 10 includes a mobile unit 12, such as, for example, a tool bar configured to be towed by a towing vehicle (not shown), such as a tractor. A traveler arrangement 14 is operably coupled to the mobile unit 12 to ride on the surface of the stubble residues as the mobile unit 12 moves across the land to be cultivated.

A fluid reservoir 16 and a pump 18 are accommodated on the mobile unit 12 and operably coupled to a fluid jet cutting head 20 mounted on the traveler arrangement 14 to selectively supply high pressure fluid to the fluid jet cutting head 20 for generating and discharging a high-pressure fluid jet J from the fluid jet cutting head 20, as shown in FIG. 2. The pump 18 may be, for example, a direct drive or intensifier pump with operating pressure ratings ranging from at least about 5,000 psi to about 100,000 psi and higher. Advantageously, the high pressure fluid jet J (e.g., a pure waterjet) may be used to make a cut through the stubble residues and the underlying soil as the mobile unit 12 moves across the land during operation. The stubble residues and the underlying soil may be cut continuously or intermittently as the mobile unit 12 moves across the land. The fluid jet cutting head 20 may be arranged at a desired rake angle in accordance with a desired depth of cut. As an example, in the illustrated embodiment of FIGS. 1 and 2, the fluid jet cutting head 20 is oriented at a forward rake angle of about 10 degrees. In other instances, the fluid jet cutting head 20 may be oriented vertically or at a rearward rake angle.

The fluid jet cutting head 20 includes an orifice member (not shown), such as, a jewel orifice, that is configured to generate the high-pressure fluid jet J. In some embodiments, the orifice member may comprise a diamond orifice member to extend the service life of the fluid jet cutting head 20 and prevent or reduce undesirable system downtime. In addition, in some embodiments, the fluid jet cutting head 20 may include a sensor positioned downstream of the orifice member to sense a condition of the orifice member to facilitate timely servicing of the orifice member.

The depth of cut can be selectively adjusted by adjusting the pressure and/or jet orifice size of the orifice member used to generate the fluid jet J, and the depth of the cut will depend on, inter alia, the thickness and content of the stubble residues, the moisture content of the soil, the nature of the soil (e.g., light/sandy or heavy black—or clay—soil) and/or the required depth of the furrow.

With continued reference to FIGS. 1 and 2, the high-pressure fluid jet system 10 further includes a soil opening device 22 coupled to the traveler arrangement 14 aft of the fluid jet cutting head 20 to form a furrow in the ground in line with the cut made by the high-pressure fluid jet J that is discharged from the fluid jet cutting head 20 during operation. For example, the soil opening device 22 of the illustrated embodiment of FIGS. 1 and 2 is shown as a tine member 24. In other instances, the soil opening device may comprise a conventional single- or double-disc opener or other conventional device for forming a furrow in the wake of the cut formed by the discharged fluid jet J.

According to the illustrated embodiment of FIGS. 1 and 2, the tine member 24 may be movably coupled to the traveler arrangement 14 to enable selective adjustment of a depth of engagement of the tine member 24 with the land being cultivated. The tine member 24 may include a seed conduit 25 extending therethrough for depositing seeds into the furrow as the tine member 24 passes through the soil to form the furrow. The seed conduit 25 may open to a cavity 23 at a backside of tine member 24 to assist in depositing the seeds within the furrow formed in the wake of the tine member 24 as it passes through the soil. In other instances, a separate seed conduit or seed depositing device may be provided external to the tine member 24.

During operation, a depth of engagement of the tine member 24 may be adjusted via a drive motor 26 operably coupled to the tine member 24, such as, for example, via a rack and gear arrangement 27, 28, as shown best in FIG. 2. The high-pressure fluid jet system 10 may further include a controller 29 in communication with the drive motor 26, the controller 29 being configured to control the depth of soil engagement of the tine member 24 before and/or during formation of the furrow. In some instances, the controller 29 may be configured to control the depth of soil engagement based at least in part on soil conditions, which may be obtained via one or more soil sensors (not shown) or other soil data sources. Also, in some instances, the controller 29 may be configured to control the depth of soil engagement in coordination with the fluid jet J discharged from the fluid jet cutting head 20 to form a series of furrows in the soil underlying the stubble residues. More particularly, the tine member 24 may be intermittently lowered to form a furrow in coordination with intermittent cuts performed by the fluid jet cutting head 20 to form a series of furrows, rather than one continuous furrow.

With continued reference to FIGS. 1 and 2, the high-pressure fluid jet system 10 further includes a liquid injector nozzle 30 coupled to the traveler arrangement 14 separate from the fluid jet cutting head 20. The liquid injector nozzle 30 is arranged to discharge a liquid L comprising at least one of an insecticide, a wetter, a fungicide, a herbicide and a fertilizer into the soil as the mobile unit 12 moves across the land during operation. The liquid injector nozzle 30 may be positioned in line with the fluid jet cutting head 20 and immediately behind the fluid jet cutting head 20 to discharge the insecticide, the wetter, the fungicide, the herbicide and/or the fertilizer immediately into the cut in the soil made by the high pressure fluid jet J discharged by the fluid jet cutting head 20. In this manner, the liquid L may be applied in a location closer to the active root system, maximizing the potential for crop uptake. The liquid injector nozzle 30 may be coupled to a liquid source 31 provided on the mobile unit 12, the liquid source 31 comprising the at least one of the insecticide, the wetter, the fungicide, the herbicide and the fertilizer. The controller 29 may be communicatively coupled to the liquid source 31 and configured to control the supply of the liquid to the liquid injector nozzle 30 in coordination with the high-pressure fluid jet discharged from the fluid jet cutting head 20, such as, for example, by appropriate electronic valves. In this manner, discharging of the liquid L from the liquid injector nozzle 30 can be controlled to be dispensed into the cut or cuts made by the high-pressure fluid jet J as desired. In some instances, the liquid L from the liquid injector nozzle 30 may be dispensed into only a portion of a longitudinal length of the cut made by the fluid jet cutting head 20. In some instances, the liquid from the liquid injector nozzle 30 may be dispensed in pulses in regular intervals along a longitudinal length of the cut.

The high-pressure fluid jet system 10 further includes a seed source 35 and a seeding device 36 coupled to the traveler arrangement 14. The seeding device 36 is operable to deposit seeds S from the seed source 35 into the furrow formed by the soil opening device 22. As can be appreciated from FIGS. 1 and 2, the seeding device 36 may be coupled to or integrally formed with the soil opening device 22 to deposit seeds S in the furrow through the soil opening device 22 itself (e.g., through seed conduit 25 in tine member 24). Seeds may be deposited under the force of gravity, positive pressure or otherwise. The controller 29 may be communicatively coupled to the seed source 35 and/or seeding device 36, and may be configured to coordinate the delivery of seeds S from the seed source 35 with the formation of the furrow in the ground. Seeds S may be dispensed, for example, at regular intervals within the furrow as it is formed.

The high-pressure fluid jet system 10 further includes a seed-firmer device 38 positioned aft of the soil opening device 22 and configured to improve seed to soil contact of the seeds S deposited into the furrow. In some instances, a conventional seed-firmer or press wheel may be positioned to trail behind the traveler arrangement 14, and in other instances, the seed-firmer device 38 may be coupled directly to or formed integrally with the traveler arrangement 14.

According to the illustrated embodiment of FIGS. 1 and 2, the traveler arrangement 14 of the high-pressure fluid jet system 10 comprises a standoff distance control mechanism 40 to maintain a jet outlet 21 of the fluid jet cutting head 20 at a desired height above a surface of the stubble residues during operation. The standoff distance control mechanism 40 of the illustrated embodiment includes a ski member 42 arranged to ride on the surface of the stubble residues via a parallel link arm assembly 44. The fluid jet cutting head 20 is coupled to the ski member 42 with a jet outlet 21 thereof in close proximity to an underside 43 of the ski member 42 so as to maintain the fluid jet cutting head 20 at the desired height above the surface of the stubble residues during operation. In some embodiments, the aft end of the ski member 42 may be shaped (e.g., opposing bulges provided on the underside of the trailing portion of the ski member 42) to serve as the seed-firmer device 38 to close the furrow and improve seed to soil contact of the seeds deposited into the furrow formed by the soil opening device 22. In other instances, a conventional seed-firmer device, such as, for example, a press-wheel may be positioned to trail behind the ski member 42 and to assist in closing the furrow after the seeds S are deposited.

Although the embodiment illustrated in FIGS. 1 and 2 is shown as including a single fluid jet cutting head 20, it is appreciated that a plurality of fluid jet cutting heads 20 may be arranged in a parallel arrangement on the mobile unit 12, with each fluid jet cutting head 20 being operable to selectively discharge a respective high-pressure fluid jet J into the land to make parallel cuts through the stubble residues and underlying soil. For example, the portion of the high-pressur fluid jet system 10 shown in FIGS. 1 and 2, including the traveler arrangement 14, the fluid jet cutting head 20, the soil opening device 22 and the liquid injector nozzle 30, may be repeated in like sub-assemblies across a width of the mobile unit 12. The high-pressure fluid jet cutting heads 20 of these sub-assemblies may be coupled to a common fluid reservoir 16 and a common high-pressure pump 18, and the liquid injector nozzles 30 may be coupled to a common liquid source 31. One or more controllers 29 may be used to control the fluid jet cutting, liquid injection, and seed depositing activities.

Although the embodiment illustrated in FIGS. 1 and 2 is shown as including a liquid injector nozzle 30 for injecting liquid into the soil, and more particularly, within a cut made by the high-pressure fluid jet J discharged from the fluid jet cutting head 20, it is appreciated that in other embodiments that an additive comprising at least one of an insecticide, a wetter, a fungicide, a herbicide and a fertilizer may be mixed with the fluid jet J itself prior to being discharged into the soil. This may be provided in addition to or in lieu of the functionality provided by the liquid injector nozzle 30. As an example, an additive source 37 may be accommodated on the mobile unit 12 and coupled to the fluid jet cutting head 20 to supply an additive to be selectively mixed with the high-pressure fluid jet J after jet formation, the additive comprising at least one of an insecticide, a wetter, a fungicide, a herbicide and a fertilizer in liquid or granular form. The controller 29 may be communicatively coupled to the additive source 37, the controller 29 being configured to control the supply of the additive to the fluid jet cutting head 20 for mixing the additive with the high-pressure fluid jet J during all or only a portion of the time in which the high-pressure fluid jet J is discharged from the fluid jet cutting head 20.

Figure 3:
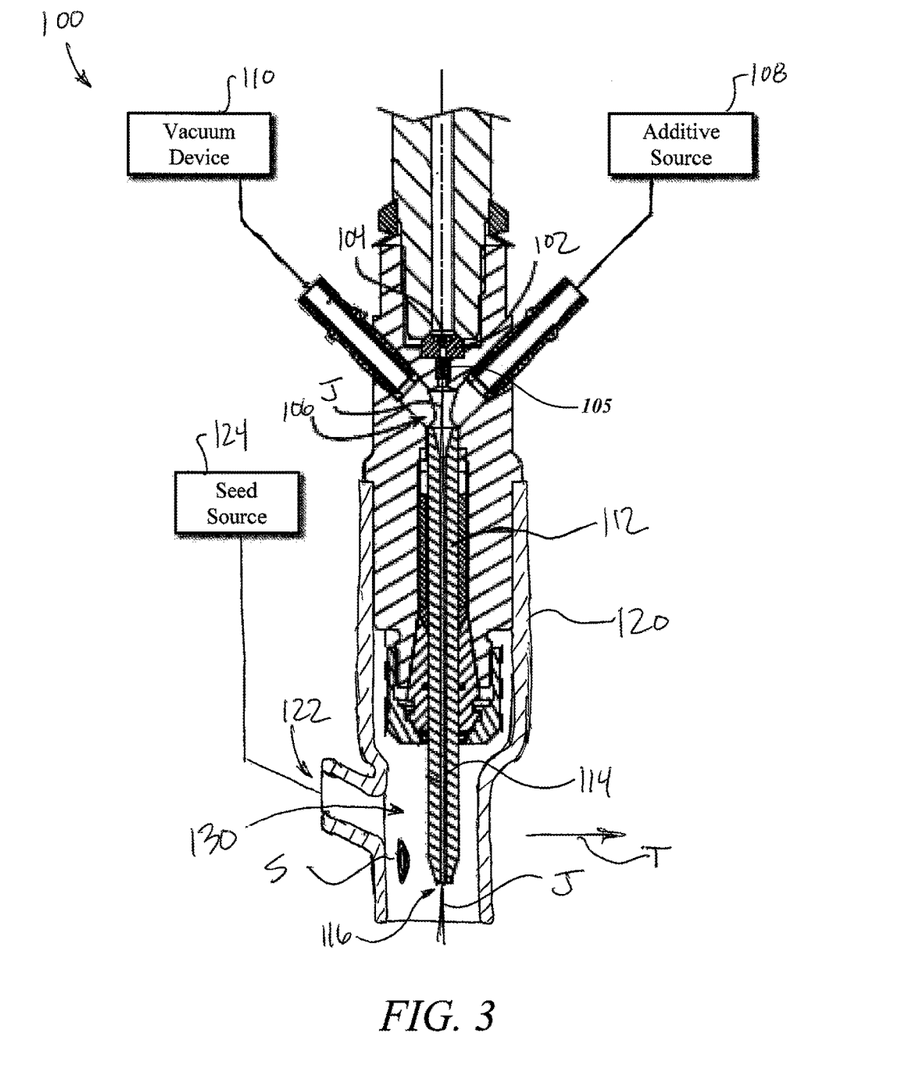
FIG. 3 is a cross-sectional view of a high-pressure fluid jet cutting head, according to one embodiment.

FIG. 3 shows one example of a cutting head 100 that is particularly well suited for discharging a high-pressure fluid jet J mixed with an additive such as an insecticide, a wetter, a fungicide, an herbicide and/or a fertilizer. The high-pressure fluid jet cutting head 100 includes an orifice unit 102 comprising an orifice member 104 (e.g., jewel orifice) that is configured to generate the high-pressure fluid jet J as high-pressure fluid from a suitable high-pressure pump passes through the orifice member 104. A mixing chamber 106 is provided downstream of the orifice member 104 and is in fluid communication with an additive source 108 to enable the additive to be introduced into the high-pressure fluid jet J. A vacuum device 110 may be provided in fluid communication with the mixing chamber 106 to assistive in drawing the additive into the high-pressure fluid jet cutting head 100 to mix with the fluid jet J. The high-pressure fluid jet cutting head 100 further includes a mixing nozzle 112 in fluid communication with the mixing chamber 106. The mixing nozzle 112 includes a discharge conduit 114 through which the additive and high-pressure fluid jet are further mixed prior to discharge from a jet outlet 116 thereof. In some instances, a sensor 105 may be provided downstream of the orifice member 104 to sense a condition of the orifice member 104.

In some instances, such as, for example, when using a high-pressure fluid jet to form a furrow, or in other instances, when using a high-pressure fluid jet aft of a soil opening device, the high-pressure fluid jet cutting head 100 may be configured to assist in depositing seeds into the furrow itself. In one particular arrangement, for example, a shroud 120 or other cutting head component may be provided to surround a portion of the jet J downstream of the orifice member 104 and may include a port 122 for introducing seeds from a seed source 124 to be deposited into one or more furrows. In some instances, the port 122 may be arranged relative to the jet J such that suction arising from movement of the high-pressure fluid jet J through the high-pressure fluid jet cutting head 100 assists in drawing the seeds S into the furrow. In some instances, the seeds S may be deposited through a seed passage 130 formed between the shroud 120 (or other cutting head component) and a nozzle (e.g., mixing nozzle 112) of the high-pressure fluid jet cutting head 100 such that the seeds S are deposited in the furrow just aft of the high-pressure fluid jet J during operation as the nozzle moves in the travel direction T.

Figure 4:
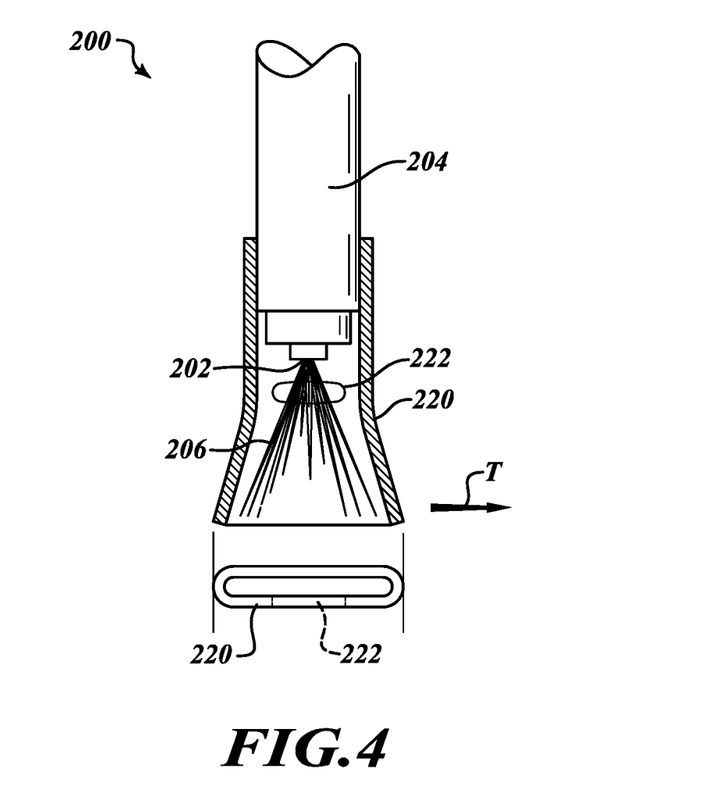
FIG. 4 is an elevational view and corresponding bottom view of a high-pressure fluid jet cutting head, according to another embodiment, with a shroud thereof cut-away to reveal a fan-shaped jet.
Figure 5:
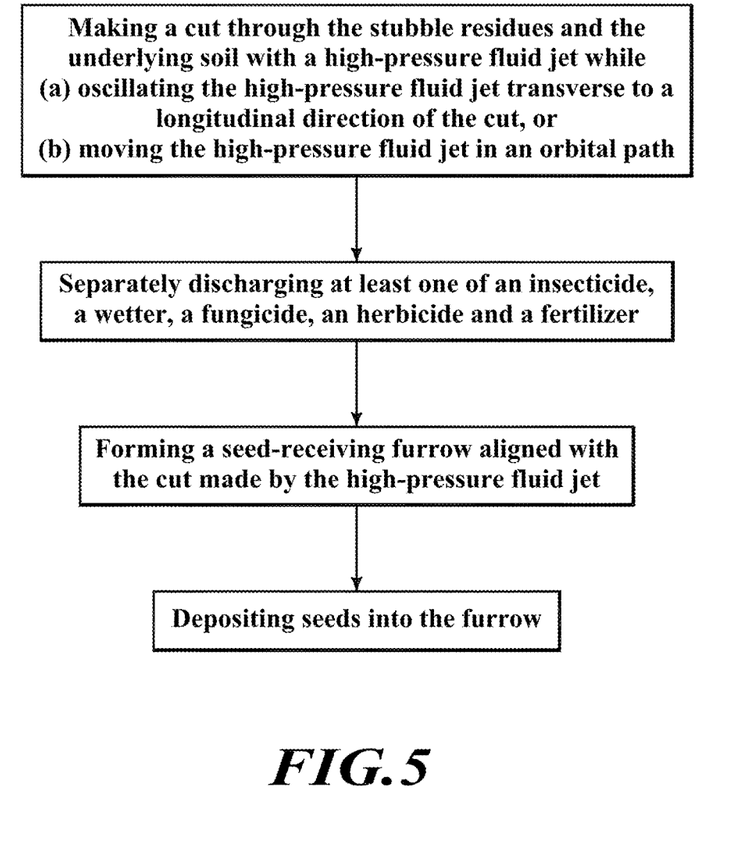
FIG. 5 illustrates example seeding methods according to embodiments of the present invention.

FIG. 4 shows yet another example of a high-pressure fluid jet cutting head 200 that may be used in connection with the systems and methods disclosed herein. According to the embodiment of FIG. 4, the high-pressure fluid jet cutting head 200 comprises an orifice member 202 supported by a nozzle or nozzle body 204, which is configured to generate a high-pressure fluid jet as a fan shaped jet 206 as high-pressure fluid from a suitable high-pressure pump passes through the orifice member 202. For example, the orifice member 202 may include an oblong aperture through which the high-pressure fluid passes to generate the fan shaped jet 206. The fan shaped jet 206 may be characterized by a narrow jet width and an elongated jet length, and the elongated jet length may be aligned with a direction of travel T of the high-pressure fluid jet cutting head 200 as it moves across the land during operation.

The high-pressure fluid jet cutting head 200 may further comprise a shroud 220 or other cutting head component that surrounds a portion of the high-pressure fluid fan shaped jet 206 downstream of the orifice member 202. The shroud 220 or other cutting head component may be provided with a port 222 through which an additive (e.g., an insecticide, a wetter, a fungicide, a herbicide and a fertilizer) may be selectively supplied during operation to mix with the high-pressure fluid fan shaped jet 206. The additive may be supplied in liquid form, solid form or other suitable form, such as in a foam or slurry.

In some embodiments, a high-pressure fluid jet may be used to create a seed-receiving furrow without the assistance of a soil opening device, such as a single- or double disc opener. In such instances, it may be advantageous to widen a cut or kerf in the soil to facilitate the deposit of seeds therein. For this purpose, the fluid jet cutting head 20, 100, 200 may be configured to oscillate along a direction transverse to a travel direction of the mobile unit to widen the cut in the soil made by the fluid jet cutting head 20, 100, 200. In other instances, the fluid jet cutting head 20, 100, 200 may be configured to move in an orbital path to widen the cut in the soil. In such instances, means for generating oscillating motion or orbital motion, such as a motor 19 (FIGS. 1 and 2), may be provided between the fluid jet cutting head 20, 100, 200 and adjacent support structures (e.g., traveler arrangement 14) to enable the cutting head 20 and fluid jet J discharged therefrom to oscillate back and forth or to move in an orbital path during use. In still further embodiments, a plurality of fluid jet cutting heads 20, 100, 200 may be arranged to form a single furrow using a plurality of fluid jets.

In accordance with embodiments of the high-pressure fluid jet cutting systems disclosed herein, related methods may be provided, including, for example, methods of seeding. The methods may include, for example, making a cut through stubble residues and underlying soil with a high-pressure fluid jet; separately injecting at least one of an insecticide, a wetter, a fungicide, a herbicide and a fertilizer into the soil; forming a seed-receiving furrow aligned with the cut made by the high-pressure fluid jet; and depositing seeds into the furrow. The method may further include improving seed to soil contact of the seeds deposited into the furrow with a seed-firmer device.

Making the cut through the stubble residues and the underlying soil with the high-pressure fluid jet may include simultaneously compressing the stubble residues, such as, for example, by compressing the stubble residues with a ski member that is configured to ride on a surface of the stubble residues during operation and maintain the cutting head at a desired standoff from the stubble residues. The magnitude of the compressing force on the stubble residues may be selected to minimize air gaps within the stubble residues without significantly compacting the underlying soil to facilitate fluid jet cutting of such stubble residues.

Injecting the insecticide, the wetter, the fungicide, the herbicide and/or the fertilizer into the soil may include utilizing a liquid injector positioned in line with a fluid jet cutting head from which the high-pressure fluid jet is discharged. In this manner, the insecticide, the wetter, the fungicide, the herbicide and/or the fertilizer may be injected directly into the cut formed by the fluid jet cutting head.

Forming the seed-receiving furrow may include moving a tine member through the underlying soil, and feeding seeds into the furrow via a seed passage of the tine member. Moving the tine member through the underlying soil may include adjusting a depth of soil engagement of the tine member.

Making the cut through the stubble residues and the underlying soil with the high-pressure fluid jet may include generating the high pressure fluid jet with an orifice unit of a fluid jet cutting head using high-pressure fluid supplied by a pump; mixing an additive with the high-pressure fluid jet after jet formation, the additive comprising at least one of an insecticide, a wetter, a fungicide, a herbicide and a fertilizer; and discharging the high-pressure fluid jet mixed with the additive into the ground. The mixing may occur in a mixing chamber downstream of the orifice unit or through a shroud or other cutting head component that surrounds the fluid jet. The mixing may include entraining the additive into the high-pressure fluid jet using suction arising from movement of the high-pressure fluid jet through the fluid jet cutting head. In other instances, an additive may be provided in the high-pressure fluid which is supplied directly to the cutting head by the pump.

Although embodiments are often described herein in the context of cultivating land having soil underlying stubble residues using a high-pressure fluid jet (e.g., high-pressure waterjet), it is appreciated that aspects of the systems and methods described herein may be used to cultivate other lands lacking such stubble residues.

Additionally, although embodiments are described herein in the context of a mobile system that may be towed by a suitable towing vehicle, such as, for example, a tractor, it is appreciated that the mobile unit may be provided as a drivable unit itself.

It is also appreciated that aspects of the high-pressure fluid jet systems and related methodology described herein may be used in connection with a wide range of agricultural equipment to process of variety of different land types for planting, seeding or sowing a variety of crops.

Moreover, aspects and features of the various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts or features of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A high-pressure fluid jet system to assist with cultivating land having soil underlying stubble residues, the system comprising:
a mobile unit;
a traveler arrangement operably coupled to the mobile unit to ride on the surface of the stubble residues as the mobile unit moves across the land;
a fluid reservoir;
a pump coupled to the fluid reservoir and operable to selectively provide a source of high-pressure fluid;
a fluid jet cutting head coupled to the traveler arrangement and configured to receive high-pressure fluid from the pump, and being operable to selectively discharge a high-pressure fluid jet to make a cut through the stubble residues and the underlying soil as the mobile unit moves across the land during operation;
a soil opening device including a tine member coupled to the traveler arrangement aft of the fluid jet cutting head to form a furrow in the ground in line with the cut made by the high-pressure fluid jet discharged from the fluid jet cutting head during operation;
a liquid injector nozzle coupled to the traveler arrangement separate from the fluid jet cutting head and arranged to discharge at least one of an insecticide, a wetter, a fungicide, an herbicide and a fertilizer as the mobile unit moves across the land during operation,
a drive motor operably coupled to the tine member for adjusting a depth of soil engagement of the tine member; and
a controller in communication with the drive motor for controlling the depth of soil engagement of the tine member.

2. The system of claim 1 wherein the traveler arrangement comprises a standoff distance control mechanism to maintain a jet outlet of the fluid jet cutting head at a desired height above a surface of the stubble residues during operation.

3. The system of claim 2 wherein the standoff distance control mechanism includes a ski member arranged to ride on the surface of the stubble residues, the fluid jet cutting head being coupled to the ski member with the jet outlet thereof in close proximity to an underside of the ski member so as to maintain the fluid jet cutting head at the desired height above the surface of the stubble residues.

4. The system of claim 3 wherein an aft portion of the ski member is shaped to serve as a seed-firmer device to improve seed to soil contact of seeds deposited into the furrow formed by the soil opening device during operation.

5. The system of claim 1, further comprising:
a seeding device coupled to the traveler arrangement and operable to deposit seeds in the furrow formed by the soil opening device.

6. The system of claim 5, further comprising:
a seed-firmer device positioned aft of the soil opening device and configured to improve seed to soil contact of the seeds deposited into the furrow.

7. The system of claim 1 wherein the tine member includes a seed conduit extending therethrough for depositing seeds into the furrow as the tine member passes through the soil to form the furrow.

8. The system of claim 1 wherein the controller is configured to control the depth of soil engagement based at least in part on soil condition.

9. The system of claim 1 wherein the controller is configured to control the depth of soil engagement in coordination with the fluid jet discharged from the fluid jet cutting head to form a series of furrows in the soil underlying the stubble residues.

10. The high-pressure fluid jet system of claim 1, further comprising:
a liquid source, the liquid source coupled to the liquid injector nozzle to supply liquid to be discharged, the liquid comprising the at least one of the insecticide, the wetter, the fungicide, the herbicide and the fertilizer.

11. The system of claim 10, further comprising:
a controller in communication with the liquid source, the controller being configured to control the supply of the liquid to the liquid injector nozzle in coordination with the high-pressure fluid jet discharged from the fluid jet cutting head.

12. The system of claim 1, further comprising:
a seed source; and
a controller in communication with the seed source, the controller being configured to coordinate the delivery of seeds from the seed source with the formation of the furrow in the ground.

13. The system of claim 1 wherein the fluid jet cutting head comprises:
an orifice member that is configured to generate the high-pressure fluid jet as a fan shaped jet as the high-pressure fluid from the pump passes through the orifice member.

14. The system of claim 13 wherein the fan shaped jet is characterized by a narrow jet width and an elongated jet length, and wherein the elongated jet length is aligned with a direction of travel of the fluid jet cutting head as the mobile unit moves across the land during operation.

15. The system of claim 1 wherein the fluid jet cutting head comprises:
an orifice member configured to generate the high-pressure fluid jet as the high-pressure fluid from the pump passes through the orifice member; and
a shroud to surround a portion of the high-pressure fluid jet downstream of the orifice member, the shroud including a port through which an additive is selectively supplied to mix with the high-pressure fluid jet.

16. The system of claim 1 wherein the fluid jet cutting head is one of a plurality of fluid jet cutting heads arranged in a parallel arrangement on the mobile unit, each fluid jet cutting head being operable to selectively discharge a respective high-pressure fluid jet into the land to make parallel cuts through the stubble residues and underlying soil.

17. The system of claim 1 wherein the fluid jet cutting head includes an orifice member configured to generate the high-pressure fluid jet and a sensor positioned downstream of the orifice member to sense a condition of the orifice member.

18. The system of claim 1 wherein the fluid jet cutting head includes a diamond orifice member configured to generate the high-pressure fluid jet as the high-pressure fluid from the pump passes through the diamond orifice member during operation.

19. The system of claim 1 wherein the pump is operable to selectively provide a source of high-pressure fluid at an operating pressure of at least 5,000 psi.

20. The system of claim 1 wherein the fluid jet cutting head comprises:
an orifice member configured to generate the high-pressure fluid jet as the high-pressure fluid from the pump passes through the orifice member, a mixing chamber downstream of the orifice member, the mixing chamber being in fluid communication with an additive source to enable an additive to be introduced into the high-pressure fluid jet, the additive comprising at least one of an insecticide, a wetter, a fungicide, a herbicide and a fertilizer; and a mixing nozzle in fluid communication with the mixing chamber, the mixing nozzle including a discharge conduit through which the additive and high-pressure fluid jet are further mixed prior to discharge from a jet outlet of the fluid jet cutting head.

21. A high-pressure fluid jet system to assist with cultivating land having soil underlying stubble residues, the system comprising:

a mobile unit;
a traveler arrangement operably coupled to the mobile unit to ride on the surface of the stubble residues as the mobile unit moves across the land;
a fluid reservoir;
a pump coupled to the fluid reservoir and operable to selectively provide a source of high-pressure fluid;
a fluid jet cutting head coupled to the traveler arrangement and configured to receive high-pressure fluid from the pump, and being operable to selectively discharge a high-pressure fluid jet to make a cut through the stubble residues and the underlying soil as the mobile unit moves across the land during operation;
a soil opening device coupled to the traveler arrangement all of the fluid jet cutting head to form a furrow in the around in line with the cut made by the high-pressure fluid jet discharged from the fluid jet cutting head during operation;
a liquid injector nozzle coupled to the traveler arrangement separate from the fluid jet cutting head and arranged to discharge at least one of an insecticide, a wetter, a fungicide, an herbicide and a fertilizer as the mobile unit moves across the land during operation; and
an additive source coupled to the fluid jet cutting head to supply an additive to be selectively mixed with the high-pressure fluid jet after jet formation, the additive comprising at least one of an insecticide, a wetter, a fungicide, an herbicide and a fertilizer.

22. The system of claim 21, further comprising:
a controller in communication with the additive source, the controller being configured to control the supply of the additive to the fluid jet cutting head for mixing the additive with the high-pressure fluid jet only during a portion of a time in which the high-pressure fluid jet is discharged from the fluid jet cutting head.

23. A high-pressure fluid jet system to assist with cultivating land having soil underlying stubble residues, the system comprising:

a mobile unit;
a traveler arrangement operably coupled to the mobile unit to ride on the surface of the stubble residues as the mobile unit moves across the land;
a fluid reservoir;
a pump coupled to the fluid reservoir and operable to selectively provide a source of high-pressure fluid,
a fluid jet cutting head coupled to the traveler arrangement and configured to receive high-pressure fluid from the pump, and being operable to selectively discharge a high-pressure fluid jet to make a cut through the stubble residues and the underlying soil as the mobile unit moves across the land during operation;
a soil opening device coupled to the traveler arrangement aft of the fluid jet cutting head to form a furrow in the ground in line with the cut made by the high-pressure fluid jet discharged from the fluid jet cutting head during operation;
a liquid injector nozzle coupled to the traveler arrangement separate from the fluid jet cutting head and arranged to discharge at least one of an insecticide, a wetter, a fungicide, an herbicide and a fertilizer as the mobile unit moves across the land during operation, and
a controller in communication with the fluid jet cutting head, the controller being configured to control the fluid jet cutting head to intermittingly discharge the high-pressure fluid jet into the ground as the mobile unit moves across the land to make intermittent cuts in the stubble residues and underlying soil.

24. A high-pressure fluid jet system to assist with cultivating land having soil underlying stubble residues, the system comprising:

a mobile unit;
a traveler arrangement operably coupled to the mobile unit to ride on the surface of the stubble residues as the mobile unit moves across the land;
a fluid reservoir;
a pump coupled to the fluid reservoir and operable to selectively provide a source of high-pressure fluid;
a fluid jet cutting head coupled to the traveler arrangement and configured to receive high-pressure fluid from the pump, and being operable to selectively discharge a high-pressure fluid jet to make a cut through the stubble residues and the underlying soil as the mobile unit moves across the land during operation, and wherein the fluid jet cutting head is configured to oscillate along a direction transverse to a travel direction of the mobile unit to widen the cut in the stubble residues and underlying soil made by the fluid jet cutting head during operation;
a soil opening device coupled to the traveler arrangement aft of the fluid jet cutting head to form a furrow in the around in line with the cut made by the high-pressure fluid jet discharged from the fluid jet cutting head during operation; and
a liquid injector nozzle coupled to the traveler arrangement separate from the fluid jet cutting head and arranged to discharge at least one of an insecticide, a wetter, a fungicide, an herbicide and a fertilizer as the mobile unit moves across the land during operation.

25. A high-pressure fluid jet system to assist with cultivating land having soil underlying stubble residues, the system comprising:

a mobile unit;
a traveler arrangement operably coupled to the mobile unit to ride on the surface of the stubble residues as the mobile unit moves across the land;
a fluid reservoir;
a pump coupled to the fluid reservoir and operable to selectively provide a source of high-pressure fluid;
a fluid jet cutting head coupled to the traveler arrangement and configured to receive high-pressure fluid from the pump, and being operable to selectively discharge a high-pressure fluid jet to make a cut through the stubble residues and the underlying soil as the mobile unit moves across the land during operation, and wherein the fluid jet cutting head is configured to move in an orbital path to widen the cut in the stubble residues and underlying soil made by the fluid jet cutting head during operation;

a soil opening device coupled to the traveler arrangement all of the fluid jet cutting head to form a furrow in the around in line with the cut made by the high-pressure fluid let discharged from the fluid jet cutting head during operation; and a liquid injector nozzle coupled to the traveler arrangement separate from the fluid jet cutting head and arranged to discharge at least one of an insecticide, a wetter, a fungicide, an herbicide and a fertilizer as the mobile unit moves across the land during operation.

26. A seeding method for land having soil underlying stubble residues, the method comprising:

making a cut through the stubble residues and the underlying soil with a high-pressure fluid jet while oscillating the high-pressure fluid jet transverse to a longitudinal direction of the cut;

separately discharging at least one of an insecticide, a wetter, a fungicide, an herbicide and a fertilizer;

forming a seed-receiving furrow aligned with the cut made by the high-pressure fluid jet; and depositing seeds into the furrow.

27. The method of claim 26 wherein forming the seed-receiving furrow includes moving a tine member through the underlying soil, and wherein depositing the seeds into the furrow includes depositing the seeds into the furrow through a seed passage extending through the tine member.

28. The method of claim 26 wherein making a cut through the stubble residues and the underlying soil with a high-pressure fluid jet includes simultaneously compressing the stubble residues.

29. The method of claim 26 wherein discharging at least one of the insecticide, the wetter, the fungicide, the herbicide and the fertilizer includes utilizing a liquid injector positioned in line with a fluid jet cutting head from which the high-pressure fluid jet is discharged.

30. A seeding method for land having soil underlying stubble residues, the method comprising:

making a cut through the stubble residues and the underlying soil with a high-pressure fluid et while moving the high-pressure fluid jet in an orbital path;

separately discharging at least one of an insecticide, a wetter, a fungicide, an herbicide and a fertilizer;

forming a seed-receiving furrow aligned with the cut made by the high-pressure fluid jet; and depositing seeds into the furrow.

31. A seeding method for land having soil underlying stubble residues, the method comprising:

intermittingly discharging a high-pressure fluid jet from a cutting head into the ground while moving the cutting head across the land to make intermittent cuts in the stubble residues and underlying soil;

separately discharging at least one of an insecticide, a wetter, a fungicide, an herbicide and a fertilizer, forming a seed-receiving furrow aligned with the cut made by the high-pressure fluid jet; and depositing seeds into the furrow.

32. A seeding method for land having soil underlying stubble residues, the method comprising:

making a cut through the stubble residues and the underlying soil with a high-pressure fluid jet;

selectively mixing an additive with the high-pressure fluid jet after jet formation, the additive including at least one of an insecticide, a wetter, a fungicide, an herbicide and a fertilizer;

forming a seed-receiving furrow aligned with the cut made by the high-pressure fluid jet; and depositing seeds into the furrow.

33. A seeding method for land having soil underlying stubble residues, the method comprising:

making a cut through the stubble residues and the underlying soil with a high-pressure fluid jet;

separately discharging at least one of an insecticide, a wetter, a fungicide, an herbicide and a fertilizer;

forming a seed-receiving furrow aligned with the cut made by the high-pressure fluid jet using a tine member, the forming including adjusting a depth of soil engagement of the tine member, and depositing seeds into the furrow.

34. A high-pressure fluid jet system to assist with cultivating land, the system comprising:

a traveler arrangement;

a fluid jet cutting head coupled to the traveler arrangement and configured to receive high-pressure fluid from a pump, and being operable to selectively discharge a high-pressure fluid jet; and an additive source coupled to the fluid jet cutting head to supply an additive to be selectively mixed with the high-pressure fluid jet after jet formation, the additive comprising at least one of an insecticide, a wetter, a fungicide, an herbicide and a fertilizer.

35. A high-pressure fluid jet system to assist with cultivating land, the system comprising:

a traveler arrangement;

a fluid jet cutting head coupled to the traveler arrangement and configured to receive high-pressure fluid from a pump, and being operable to selectively discharge a high-pressure fluid jet; and a liquid injector nozzle coupled to the traveler arrangement separate from the fluid jet cutting head and arranged to discharge at least one of an insecticide, a wetter, a fungicide, an herbicide and a fertilizer.

* * * * *

UNITED STATES PATENT AND TRADEMARK OFFICE
CERTIFICATE OF CORRECTION

PATENT NO. : 10,136,571 B2
APPLICATION NO. : 15/136623
DATED : November 27, 2018
INVENTOR(S) : Gregory Dean Butler et al.

Page 1 of 1

It is certified that error appears in the above-identified patent and that said Letters Patent is hereby corrected as shown below:

In the Claims

Column 15, Line 30, Claim 21, "all" should read --aft--; Column 15, Line 31, Claim 21, "around" should read --ground--.

Column 17, Line 5, Claim 25, "all" should read --aft--; Column 17, Line 6, Claim 25, "around" should read --ground--.

Signed and Sealed this
Twenty-ninth Day of October, 2019

Andrei Iancu
*Director of the United States Patent and Trademark Office*